US009952685B2

(12) United States Patent
Chassot et al.

(10) Patent No.: US 9,952,685 B2
(45) Date of Patent: Apr. 24, 2018

(54) INPUT DEVICE WITH MEANS FOR ALTERING THE OPERATING MODE OF THE INPUT DEVICE

(71) Applicant: LOGITECH EUROPE S.A., Lausanne (CH)

(72) Inventors: Jacques Chassot, Granges-de-Vesin (CH); Jean-Christophe Hemes, Champagne (CH); Steven Ryutaro Takayama, Atherton, CA (US); Christophe Dayer, Onex (CH); Nicolas Ramond, Lugrin (FR); Davin O'Mahony, Co. Cork (IE); Branko Lukic, Menlo Park, CA (US); Daniele Bonanno, Genève (CH)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 14/337,561

(22) Filed: Jul. 22, 2014

(65) Prior Publication Data

US 2016/0026268 A1  Jan. 28, 2016

(51) Int. Cl.
*G06F 3/033* (2013.01)
*G06F 3/0354* (2013.01)

(52) U.S. Cl.
CPC ...... *G06F 3/03543* (2013.01); *G06F 3/03547* (2013.01)

(58) Field of Classification Search
CPC .... G06F 3/033; G06F 3/0354; G06F 3/03543; G06F 3/03547; G06F 3/0383; G06F 2203/0336; G06F 2203/0338

USPC .................................. 345/156–158, 163–167
See application file for complete search history.

(56) References Cited

U.S. PATENT DOCUMENTS

| 6,304,252 | B1 * | 10/2001 | Elledge ................. G06F 1/1616 345/163 |
| 7,133,026 | B2 * | 11/2006 | Horie .................... G06F 3/0414 345/163 |
| 8,188,974 | B2 | 5/2012 | Bidiville et al. |
| 9,635,162 | B2 * | 4/2017 | Raynor ............... G06F 3/03543 |
| 2002/0054060 | A1 | 5/2002 | Schena |
| 2007/0000086 | A1 * | 1/2007 | Cheng ................ A47B 21/0314 16/42 R |

(Continued)

FOREIGN PATENT DOCUMENTS

JP  2007241627 A  *  9/2007

*Primary Examiner* — Jason Mandeville
(74) *Attorney, Agent, or Firm* — Benesch, Friedlander, Coplan & Aronoff LLP

(57) ABSTRACT

An input device for a computing device includes a first input sensor for receiving a first type of instructions associated with a first operating mode of the input device, the first type of instructions including moving the first input sensor with respect to a reference surface. The input device includes a second input sensor for receiving a second type of instructions associated with a second operating mode of the input device, the second type of instructions including moving an indicator with respect to an active surface of the input device provided with said second input sensor. The input device includes a control sensor adapted to detect the position of at least a portion of the hand of a user with respect to the input device. The control sensor is coupled to a controller adapted to allow the input device to operate in either the first or the second operating mode.

16 Claims, 6 Drawing Sheets

(56) References Cited

U.S. PATENT DOCUMENTS

| | | | |
|---|---|---|---|
| 2007/0013651 A1* | 1/2007 | Depue | G06F 3/03543 345/156 |
| 2007/0069088 A1* | 3/2007 | Bidiville | G06F 3/03543 248/188.9 |
| 2009/0295713 A1 | 12/2009 | Piot et al. | |
| 2013/0127719 A1 | 5/2013 | Yasutake | |
| 2013/0257729 A1* | 10/2013 | Edwards | G06F 3/044 345/163 |
| 2014/0267109 A1* | 9/2014 | Lin | G06F 3/03543 345/173 |
| 2015/0234484 A1* | 8/2015 | Winter | G06F 3/03543 345/163 |

* cited by examiner

INPUT DEVICE WITH MEANS FOR ALTERING THE OPERATING MODE OF THE INPUT DEVICE

FIELD OF INVENTION

The invention generally relates to input devices and in particular to input devices which combine the functioning of a mouse and a touch pad in one device.

BACKGROUND

Over the last few decades, several types of input devices for generating instructions for computers have been developed. These devices include mice, track balls, keyboards and touch pads. Some of these input devices generate instructions by means of movement with respect to a reference surface such as a support. Such input devices include, for instance, mice. Other input devices are adapted to translate the movement of an object with respect to an active surface of the input device into an instruction for a computer. Such devices include touch pads.

Over time, users have developed certain preferences for using specific input devices for generating specific instructions. For instance, a mouse is specifically adapted to control the movement of a cursor on a computer screen. Touch pads are specifically adapted to allow a user to link specific gestures to functions such as leafing through a number of documents. When using input devices, it should be noted that the friction between the input device and the reference surface on which the input device is used directly influences the comfort of using the input device and the accuracy of the instructions produced.

For a mouse, for example, such friction has an influence on the movement of the mouse with respect to the reference surface and the effort required by the user in moving the cursor on the computer screen from one position to another. When using a mouse, friction reduces both the speed of the user's action as well as the precision of the positioning of the cursor. Further, friction may result in the production of noise when the mouse is moved over the reference surface. Reducing friction would improve mouse gliding and precision. Further, this would help in reducing or even eliminating slip stick, which is the effect that is caused by the difference between static and dynamic friction. For this and other reasons, reducing and controlling the friction between a mouse and a reference surface can significantly enhance the user's experience.

It should be noted that when using a mouse on a reference surface, some friction is needed for comfortable use of the mouse by a user. For instance, a user would not be able to perform the much-used action of double clicking if he was unable to click on the same spot twice. As another example, when the mouse is not being used, the mouse should not move away from the position where the user has left it due to lack of friction. This could happen, for instance, if the reference surface is inclined.

The level of friction between the input device and the reference surface or support is also important for other types of devices, such as touch pads. When using a touch pad, the user moves an object or a finger over or relative to an active surface of the touch pad. The friction between the touch pad and the reference surface should be sufficient to avoid that the device itself is displaced when moving the finger or the object over the active surface. If the friction is not sufficient, the user could end up using two hands to provide instructions to a computer. One hand would be needed to keep the touch pad at a fixed position while the other hand is used to generate instructions on the active surface of the touch pad.

Given their specific advantages when producing instructions, there is a need for providing input devices which allow the combined intuitive and ergonomic input capabilities of two types of input devices. An example would be a device combining the functionality of a touch pad in combination with the conventional two-dimensional functions of a mouse.

None of the conventional input devices allow for an intuitive use of the input with, for instance, the possibility of altering the friction between the input device and a reference surface linked to a specific operating mode of the input device.

Thus, what is needed is an input device which facilitates the use of at least two operating modes, thereby allowing intuitive use of the input device.

SUMMARY

An input device for an electronic device, such as a computer, is provided. The input device includes a first input sensor for receiving a first type of instructions associated with a first operating mode of the input device. The first type of instructions include moving the first input sensor with respect to a reference surface. The input device further includes a second input sensor for receiving a second type of instructions associated with a second operating mode of the input device. The second type of instructions include moving an indicator with respect to an active surface of the input device provided with said second input sensor. The input device further includes a control sensor adapted to detect the position of at least a portion of the hand of a user with respect to the input device. The control sensor is coupled to a controller adapted to allow the input device to operate in either the first or the second operating mode, based on the detected position of said at least portion of the hand of a user.

According to one example embodiment, the controller is adapted to detect a change in the position of at least a portion of the hand of a user with respect to the input device and to allow the input device to operate in either the first or the second operating mode, based on said detected change in the position of at least a portion of the hand of a user with respect to the input device.

According to one example embodiment, the control sensor includes a pressure sensor positioned on the outside of the input device adapted to detect contact between the input device and at least a portion of the hand of a user.

According to one example embodiment, the control sensor includes an optical sensor.

According to the invention, the control sensor comprises a touch sensor, such as a capacitive sensor.

According to one example embodiment, the control sensor includes a proximity sensor.

According to one example embodiment, the input device includes a contact surface for contacting a reference surface and for providing a first resistance against movement of the input device with respect to the reference surface. The input device includes a friction member for altering the resistance against movement of the input device with respect to the reference surface. The friction member is operated by means of a controller to allow the friction member to provide a first resistance against movement in the first operating mode or mouse mode of the input device and a second resistance in the second operating mode or touch pad mode of the input device.

According to one example embodiment, the friction member of the input device can be moved from a first or non-active position to allow the input device to contact the reference surface with said contact surface and a second or active position wherein the friction member is adapted to contact the reference surface, thereby at least partly preventing the contact surface of the input device contacting the reference surface.

According to one example embodiment, the friction member includes a low-friction material such as PTFE or silicone rubber.

A method is provided for operating an electronic device, such as a computer, by means of an input device. The input device includes at least a first input sensor for receiving a first type of instructions associated with a first operating mode of the input device. The first type of instructions includes moving the first input sensor with respect to a reference surface. The input device further includes a second input sensor for receiving a second type of instructions associated with a second operating mode of the input device. The second type of instructions includes moving an indicator with respect to an active surface of the input device provided with said second input sensor. The method includes the step of providing the input device with a control sensor adapted to detect the position of at least a portion of the hand of a user with respect to the input device. The method further includes the step of connecting the control sensor to a controller adapted to allow the input device to operate in either the first or the second operating mode. The method further includes the step of detecting the position of at least a portion of the hand of a user with respect to the input device by means of the control sensor. The method further includes the step of using the controller to instruct the input device to operate in either the first or second operating mode, based on the detected position of said at least portion of the hand of a user by means of the control sensor.

According to one example embodiment, the method includes the steps of detecting a first position of at least part of the hand of a user, detecting a change in the said detected first position of the hand of a user, and using the controller to allow the input device to operate in either the first or the second operating mode, based on said detected change in the position of at least a portion of the hand of a user with respect to the input device.

According to one example embodiment, the input device includes a friction member for altering the resistance against moving of the input device with respect to the reference surface. The friction member is operated between a first or non-active position and a second or active position by means of the controller to allow the friction member to provide a first resistance against moving in the first operating mode or mouse mode of the input device and a second resistance in the second operating mode or touch pad mode of the input device. The method further includes the step of detecting the position of at least a portion of the hand of a user with respect to the input device by means of the control sensor. The method further includes the step of using the controller to instruct the friction member to be in either its first or second position to allow the input device to operate in either the first or second operating mode, based on the detected position of said at least portion of the hand of a user by means of the control sensor.

According to one example embodiment, the first operating mode of the input device is a mouse mode and the second operating mode is a touch pad mode.

An input device for generating instructions for an electronic device, such as a computer, has at least a first input sensor to allow the input device to operate in a first operating mode wherein the generation of instructions can include moving the first input sensor with respect to a reference surface and a second input sensor to allow the input device to operate in a second operating mode. The generation of instructions can include moving an indicator with respect to an active surface of the input device including said second input sensor. The input device includes a control sensor adapted to detect the position of the input device with respect to a reference surface. The control sensor is coupled to a controller adapted to allow only a first of said first and second input sensors to generate instructions based on the detected position of the input device with respect to the reference surface, to allow the input device to operate in either the first or the second operating mode based on said detected position.

According to one example embodiment, the control sensor comprises a gyroscope.

BRIEF DESCRIPTION OF THE DRAWINGS

In the accompanying drawings, structures are illustrated that, together with the detailed description provided below, describe exemplary embodiments. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
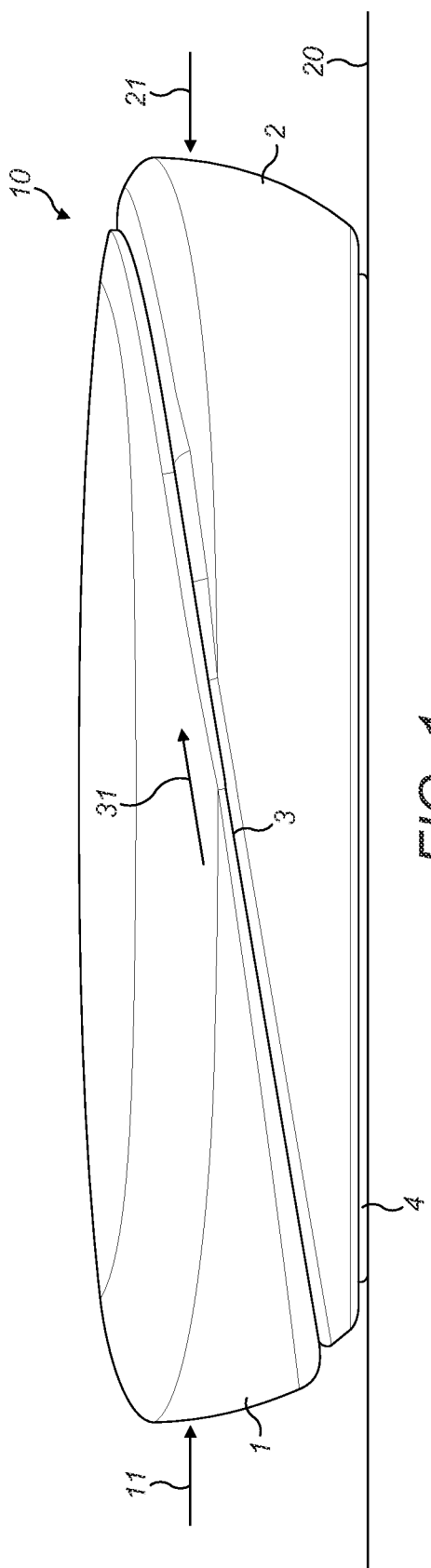
FIG. 1 shows an example embodiment of an input device.

In general, the invention relates to an input device for generating instructions for an electronic device, such as a computer, having a first and a second operating mode. The input device will typically be used on a reference surface, such as a support. In practice this support may be a desk, a table or other similar surface.

According to the present invention, the input device to be used for generating instructions for an electronic device, such as a computer, will be able to be operated in a traditional first mode or mouse mode and a second mode or touch pad mode, without the user needing to provide a specific instruction to the input device to change from the first to the second operating mode and vice versa. The change to the first or second operating mode, according to the invention, is intrinsic in that the use of the input device, and more specifically the position of the hand of the user in relation to the input device, will be sufficient to make the input device operate in its first or second operating mode.

In order to allow the input device to change from its first operating mode or mouse mode to its second operating mode or touch pad mode, it is possible to provide a mechanical element that will allow a change in the operation of the input device caused by the physical movement of one or more parts of the input device under the influence of pressure exerted on the input device by the hand of a user. Alternatively, sensors can be used to detect the actual position of the hand of the user in relation to the input device in order to thereby detect the intention of the user to use the input device either in its first operating mode or mouse mode or in its second operating mode or touch pad mode.

Below, several example embodiments are described, wherein both the mechanical and non-mechanical, i.e automatic solutions for switching between the first and second operating modes are described.

The first and second operating modes of the input device may require different levels of friction between the input device and the reference surface to allow comfortable use of the input device during the generation of instructions.

In a first example, the first operating mode for the input device is mouse mode. For comfortable use of the input device in mouse mode, the level of friction between the input device and the reference surface should be relatively low. Relatively low friction means, in the context of this text, that the input device can be moved with respect to the reference surface in a comfortable manner without the user needing to push hard to move the input device.

In the present text, the wording "lower resistance against movement" is used to make reference to the fact that the input device can be easily moved with respect to the reference surface.

In the first example, the second operating mode for the input device is a touch pad mode. For comfortable use of the input device in touch pad mode, the level of friction between the input device and the reference surface should be relatively high. In the context of this text, relatively high friction means that the input device will not move, with respect to the reference surface, when the user is exerting a certain force on the input device, such force being needed for normal use of the input device in touch pad mode.

In the present text, the wording "higher resistance against movement" is used to make reference to the fact that the input device will not move with respect to the reference surface with a normal amount of force exerted on the input device.

FIG. 1 shows a first embodiment of an input device 10. The input device 10 is adapted to operate in a first operating mode or mouse mode wherein the input device 10 may be moved with respect to a reference surface 20. The top side of the input device 10 comprises an active surface, shown in FIG. 2, to allow the input device 10 to also function in a second operating mode or touch pad mode. When the input device 10 is operating in the touch pad mode, the input device 10 will normally remain at a fixed position on the reference surface 20.

The input device 10 is provided with a first input sensor (not shown) which is adapted for receiving a first type of instructions associated with the first operating mode or mouse mode of the input device 10. This first input sensor is known from the prior art and is used in a mouse for a computer in order to receive instructions when the mouse is moved with respect to a reference surface.

Moreover, the input device 10 will be provided with a second input sensor for receiving a second type of instructions associated with the second operating mode or touch pad mode of the input device 10. The second input sensor is typically part of an active surface 40 the functioning of which is described below.

The input device according to FIG. 1 includes a top case 1 and a bottom case or chassis 2 which can be moved one with respect to the other. The movement of top case 1 with respect to chassis 2 will take place along the inclined separation 3 between the elements 1 and 2.

A contact element 4 is connected to the chassis 2. The contact element 4 is adapted to contact the reference surface 20. In the embodiment according to FIG. 1 the contact element 4 is adapted to provide relatively high friction between the bottom of the input device 10 and the reference surface 20. To obtain such a relatively high friction, the contact element 4, for instance, comprises a silicon rubber.

The input device 10 according to FIG. 1 allows a user to use the device 10 in touch pad mode by applying a force on the top of the top case 1 and more specifically on the active surface 40 present on the top case 1. The relative movement of a finger or an indicator, with respect to the active surface 40 on the top case 1, can take place without the input device 10 moving with respect to the reference surface 20. This is possible due to the presence of the relatively high friction between the contact element 4 and said reference surface 20.

Where the user wishes to change from the touch pad mode to the mouse mode, the user holds the outside of the input device 10, as indicated by arrows 11 and 21, thereby squeezing the input device 10. This results in the input device 10 changing modes without the user needing to push, change or alter anything on the input device 10. In other words, the change from a first to a second level of friction to allow the use in a second operating mode is the result of intuitive handling of the input device.

As shown in FIG. 1, the squeezing of the input device 10 produced by holding the outside of the input device 10 is the intuitive movement of the device by a user who is used to operating a conventional 2-D mouse. As a result of the user squeezing the input device 10, the friction between the bottom of the device 10 and the reference surface 20 is altered, thereby allowing use of conventional mouse mode for the input device 10.

The top case 1 and the chassis 2 can be displaced one with respect to the other by applying a force at the outside of the top case 1 and chassis 2, as indicated with the arrows 11 and 21. This force is normally applied by the fingers of a user. By applying force with the fingers, a user squeezes the input device 10 causing the top case 1 to slide along separation line 3 along the chassis 2 as indicated by arrow 31.

Figure 2:
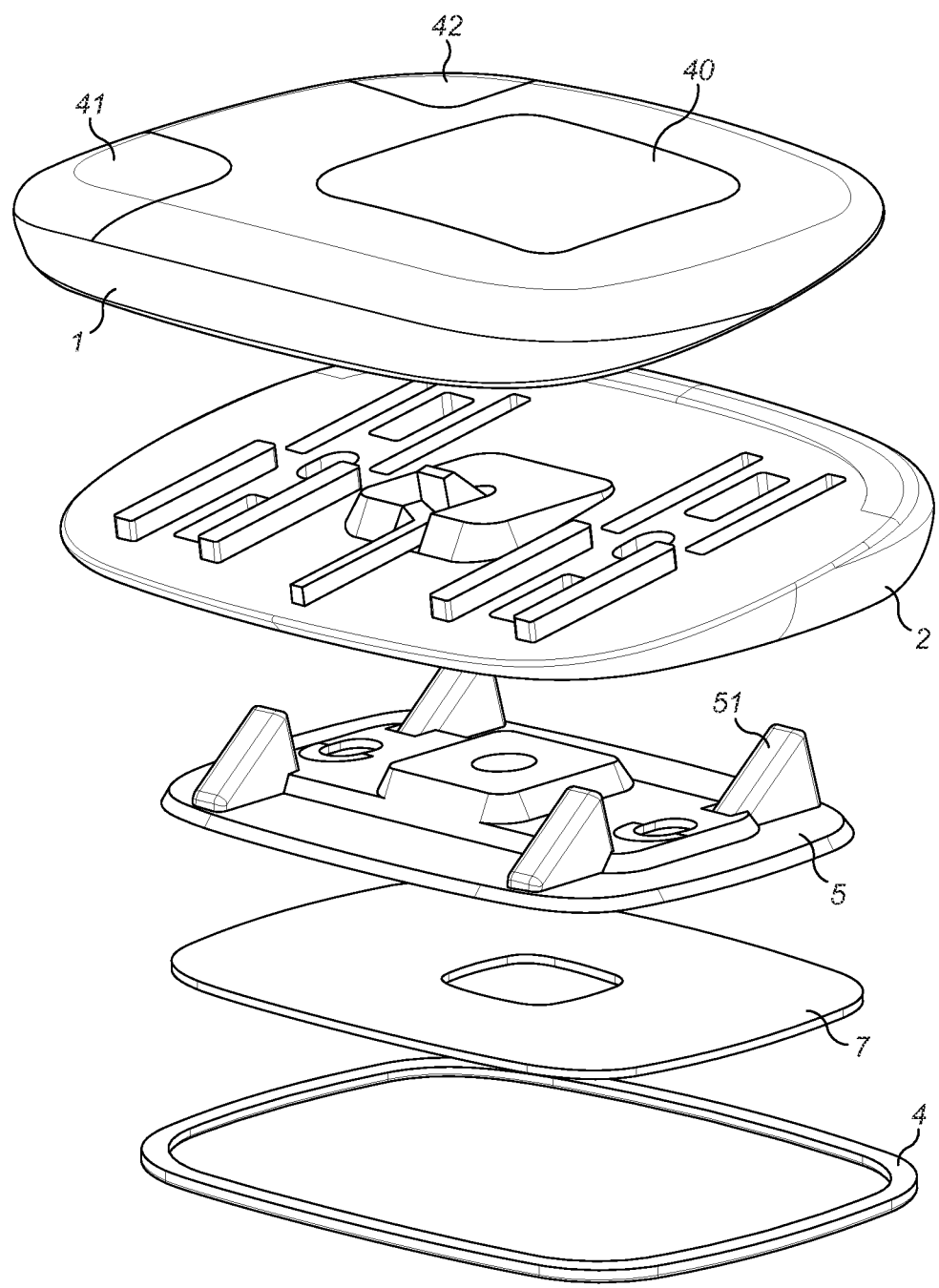
FIG. 2 is an exploded view of the device represented in FIG. 1 showing the different elements of the input device.

FIG. 2 provides an exploded view of the input device 10 according to FIG. 1. FIG. 2 shows the top case 1 which is provided with an active surface 40. This active surface 40 can be used in touch pad mode and the user can generate instructions by touching the active surface 40 either with a finger or with an object such as an indicator. The top case 1 is connected to the chassis 2 in such a manner as to allow displacement of the top case 1 with respect to the chassis 2 as explained with reference to FIG. 1.

Figure 3:
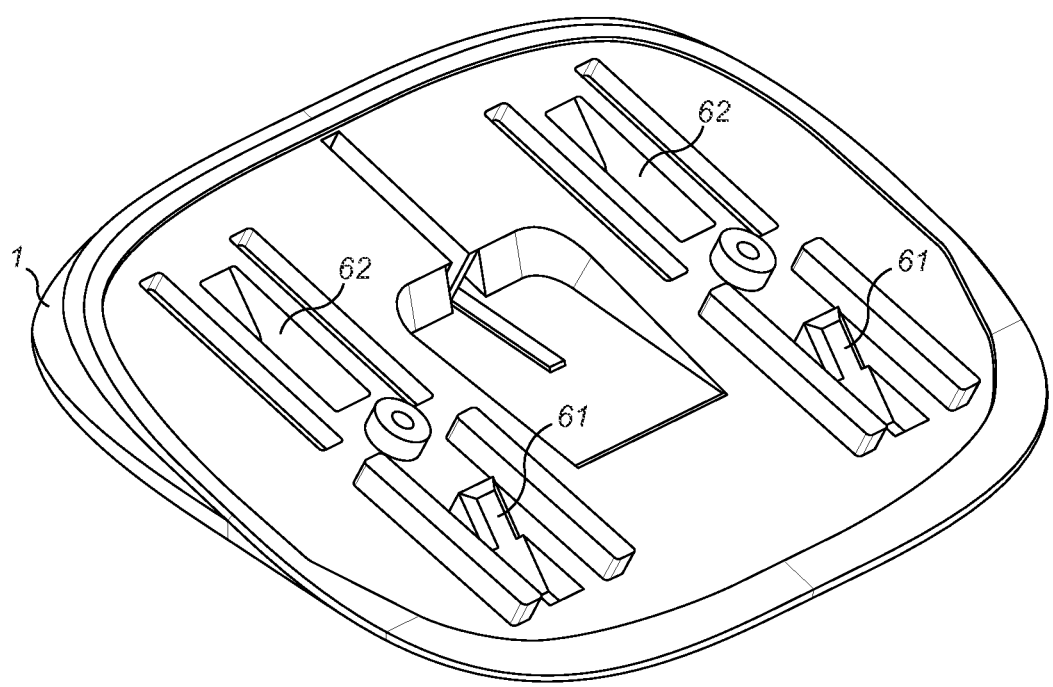
FIG. 3 shows the inside of the top case of the input device according to FIGS. 1 and 2.

As shown in FIG. 2, the input device 10 further includes a base 5. The base 5 includes ramps 51. The ramps 51 cooperate with the ramps 61 and 62 which are present at the bottom side of the top case 1 as can be seen in FIG. 3. The base 5 is, at its bottom side, connected to a plate 7 which typically includes low-friction material. The plate 7 may include Teflon©. In use, a user touches the top case 1 and the chassis 2, thereby squeezing the input device 10. The ramps 61 and 62, present on the bottom of the top case 1 push against the ramps 51 present on the base 5. This will push the base 5 downwards, whereby the plate 7 will be pushed against the reference surface 20, as shown in FIG. 1, on which the input device 10 is positioned.

The base 5, with the plate 7 being pushed downwards, lifts the top case 1 and the chassis 2 assembly away from the reference surface 20. In practice, this means that the contact element 4 which is connected to the chassis 2 will be pushed upwards and will lose contact with the reference surface 20. With the contact element 4 no longer in contact with the reference surface 20, the relatively high friction between the device 10 and the reference surface 20 is altered. The friction between the input device 10 is now determined by the contact between the contact plate and the reference surface 20. This allows movement of the input device 10 with relatively low friction with respect to the reference surface 20.

With the top case 1 and the chassis 2 being displaced one with respect to the other, the resulting level of friction of the input device 10 on the reference surface 20 alters as follows. In rest mode, the input device 10 will contact the reference surface 20 by means of the contact element 4. As the contact element 4 comprises a material having a relatively high friction, in rest mode the friction between the input device 10 and the reference surface 20 is relatively high. During the squeezing of the input device 10, the plate 7 is moved from a first position, wherein the plate 7 is not in contact with the reference surface 20, towards a second position wherein the contact plate 7 starts contacting the reference surface 20. Once the contact plate 7 is in contact with the reference surface 20, the friction between the input device 10 and the reference surface 20 is determined by a combination of the contact element 4 and the contact plate 7. After the transitional phase, the contact element 4 will be lifted upwards and retracted from contact with the reference surface 20. That means that the input device 10 contacts the reference surface 20 only by means of the plate 7. The friction between the input device 10 and the reference surface 20 will be completely determined by the friction between the plate 7 and the reference surface 20.

With reference to FIGS. 1, 2 and 3 a first embodiment of an input device 10 is described with a focus on the possibility of altering the friction between the input device and a reference surface 20.

The embodiment described with reference to FIGS. 1, 2 and 3 provides a mechanical solution for allowing the input device 10 to operate in a first operating mode or mouse mode and a second operating mode or touch pad mode. In the embodiment of FIG. 1, the change in operating mode is linked to the possibility of altering the friction between the input device 10 and a reference surface 20. The altering from the first to the second level of friction could be linked to detecting means to apply the activation of either the first or second means for receiving instructions as described above.

In addition to the mechanical solution, according to FIGS. 1, 2 and 3 the altering of friction between an input device and a reference surface could include the use of at least one electronic component, such as a sensor. In a preferred embodiment of the invention, the input device includes a least one control sensor which is adapted to function as detecting means for detecting a selected operating mode for the input device.

The detecting means could be operatively connected to the means for altering the friction between the input device and the reference surface in order to ensure the appropriate level of friction for the selected operating mode to apply. Moreover, the detecting means could be operatively connected to the selecting means in the form of a controller of the first and second input sensor to ensure that the appropriate means for receiving instructions are activated for the detected operating mode.

The detection means in the form of a control sensor could include at least one sensor for detecting the position of one or more fingers with respect to the input device. This at least one sensor could include a pressure sensor which would be adapted to detect the position of the hand and fingers of a user in contact with the input device 10. Such a pressure sensor would, for instance, be adapted to recognize the squeezing of the input device by a user which would be an indication that the user wishes to use the input device 10 as a mouse. The actual squeezing of the input device 10, as described with reference to FIG. 1, could be replaced by providing a first and a second pressure sensor on opposite sides of the input device.

If pressure sensors are used, several options are available to provide such pressure sensors. According to a first alternative, 0D capacitive sensors can be used, wherein the absence of physical contact with at least part of the hand of a user is used as binary information. Thus, the sensor is used as a button and the two options are that part of the hand is in contact with the button or that part of the hand is not in contact with such a button.

Alternatively, 1D capacitive sensors could be used. This implies that the indication of the location of the contact between at least part of the hand of the user and the sensor is provided according to one axis only.

According to a further alternative, 2D capacitive sensors can be used, wherein the location of a contact point is indicated by means of two axes.

As a third alternative, a resistive sensor can be used, wherein light physical pressure is required in order to identify contact between at least part of the hand of a user and the sensor.

As a further alternative, an electrical switch can be used, wherein contact with at least part of the hand of a user can switch between an on and an off position of said switch.

Alternatively, or additionally, the at least one control sensor could include an optical sensor which would be adapted to detect the position of at least part of the hands and fingers of a user with respect to the input device 10. Such an optical sensor would be adapted to recognize part of the hand or finger in contact with, or close to, the input device 10, wherein the detected position corresponds with the intention of a user to use the input device 10 in either mouse mode or touch pad mode.

According to a further alternative, the control sensor could comprise a proximity sensor which would be adapted to detect fingers or any other part of the hand of a user at a certain distance from the sensor. Proximity sensors could comprise capacitive or inductive sensors, wherein the presence of an element, such as part of the hand of a user, has an influence on an electrical field around the sensor. The advantage of the use of proximity sensors is that there is a certain delay in time between the detection of the presence of at least part of the hand of a user and the actual contact between the hand of a user and the input device. This time delay can provide sufficient time for the various electronic elements of the input device to change to the adapted operating mode.

The input device 10 includes further means for receiving instructions in the form of mouse buttons 41 and 42. The mouse buttons 41 and 42 are used in combination with the first input sensor (not shown) in order to allow generation of instructions in the first operating mode or mouse mode of the input device 10. As mentioned above, the input device also includes a second means for receiving instructions, in the form of a touch pad 40. The input device 10 may include a controller to allow the input device 10 to only transfer the instructions received by the first means for receiving instructions 41, 42 to a computer when the input device 10 is in its first operating mode or mouse mode and to allow the input device 10 to only transfer instructions received by the second means 40 for receiving instructions to a computer when the input device is in its second operating mode or touch pad mode. The controller may be connected to detecting means in the form of a control sensor for detecting the selected operating mode, among at least two different operating modes.

The advantage of using selecting means which are able to allow only the transfer of instructions received by the first input sensor in combination with the mouse buttons 41 and 42 or the instructions generated by means of the touch pad is that the creation of instructions is less sensitive to possible mistakes. If the input device 10 is to be used in its first operating mode or mouse mode, then any contact with the active surface 40 will not generate any unwanted instructions. If the mouse is in its second operating mode or touch pad mode, any unwanted displacement of the mouse will not generate instructions for operating the electronic device to which the input device 10 is connected.

The selective transfer of instructions may be realized in different ways. Some examples are described herein. In one example, at a starting position, the transfer of instructions from both the first input sensor and the second input sensor may be blocked. Once the control sensor detects a selected operating mode, the adapted input sensor is activated to allow transfer of instructions from said input sensor to a computer. If the control sensor no longer detects a selected operating mode for the input device, the device returns to a state wherein the transfer of instructions from both the first input sensor and the second input sensor is blocked. In another example, at a starting position, the transfer of instructions from the first input sensor is activated. Once the control sensor detects that the second operating mode is selected, the controller is adapted to deactivate the first input sensor and to activate the second input sensor. With the second input sensor activated, this second input sensor may be active until the control sensor detects that the first operating mode is selected. Alternatively, the second input sensor is deactivated and the first input sensor is activated as soon as the control sensor detects that the second operating mode is no longer selected.

In the embodiment described with reference to FIGS. 1, 2 and 3, in rest mode, the input device is in contact with the reference surface 20 with a contact element 4 having a relatively high friction coefficient. This means that, in rest mode, the input device 10 is adapted to be used in touch pad mode. In the embodiment according to FIGS. 1, 2 and 3, the friction is altered by displacing one contact plate 7 from a non-contact position to a contact position. As a first alternative (not shown in the drawings), at least two contact elements including relatively low friction material is displaced from a non-contact position to a contact position. These contact elements could comprise feet, shoes or slides, allowing the input device to move over the reference surface with the at least two feet, shoes or slides providing relatively low friction during the movement of the input device over the reference surface.

In a further alternative (not shown in the drawings), the friction between the input device and a reference surface could be altered by reducing the contact force between a contact element including relatively high friction material and a reference surface. This option would include the creation of an air stream or an air cushion between the bottom of the input device element and the reference surface.

The creation of an air stream between the bottom of the input device and a reference surface could comprise the use of a squeeze film. A squeeze film can be generated by elements, normally disc shaped, which comprise, for instance, a piezo ceramic disc. This piezo ceramic disc is connected to a piezo electric driver used to bring the piezo ceramic disc in vibration. The specific use of piezo ceramic discs for creating squeeze films to improve gliding of an input device over a reference surface is described in U.S. Pat. No. 8,188,974.

In the embodiment described with reference to FIGS. 1, 2 and 3, in rest mode, the input device is in contact with the reference surface 20 with contact element 4 including a relatively high friction material. This means that, in rest, the input device 10 is adapted to be used in touch pad mode. In a further alternative (not shown), the input device 10 can, in rest mode, be in contact with the reference surface with a contact element including a relatively low friction material and can be adapted in rest mode to be used in mouse mode. According to this alternative, the input device could include an actuator with high friction material, wherein the actuator would be adapted to be moved from a non-contact position to allow movement of the input device with respect to the reference element towards a contact position, to increase the friction between the input device and the reference surface. This means that the actuator would have the function of a brake element, adapted to limit or avoid the movement of the input device with respect to the reference surface.

Figure 4:
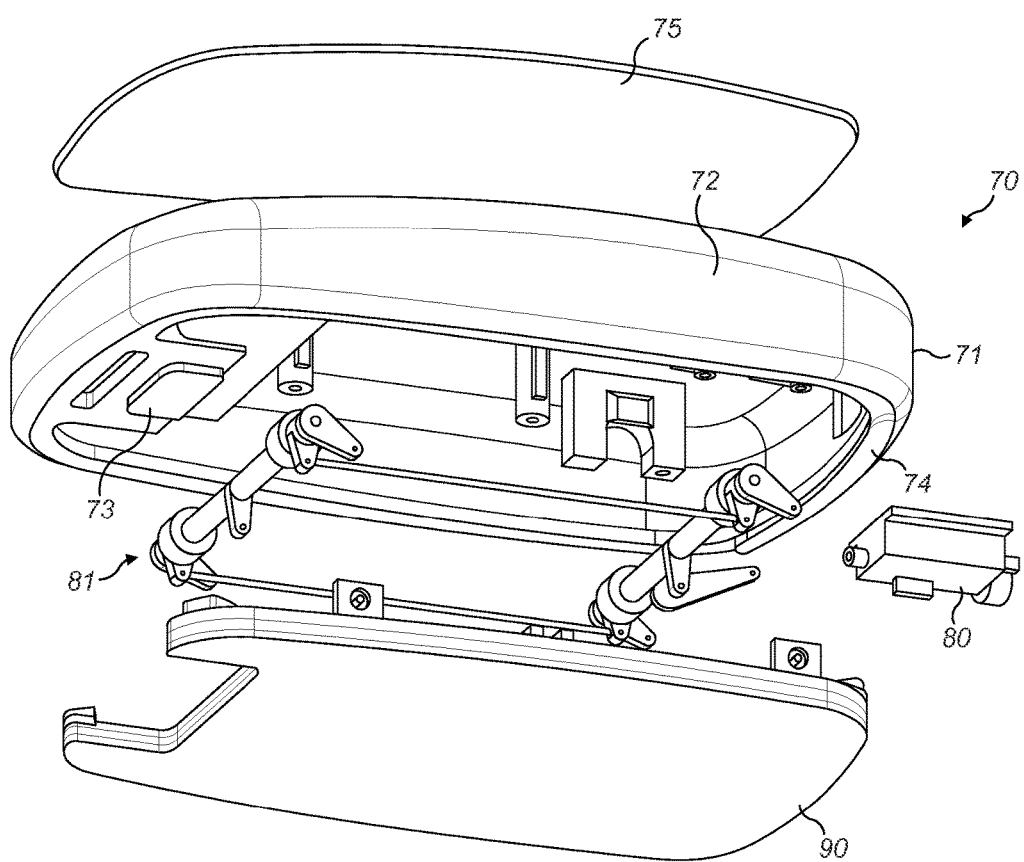
FIG. 4 shows another example embodiment of an input device.

In FIG. 4, a second embodiment of an input device 70 is shown. The input device 70 is provided with a housing 71 which, at the sides thereof, is provided with a control sensor 72 which covers the side of the housing 71. The input sensor 72 is adapted to detect the position of at least part of the hand of the user in relation to the input device 70. At the bottom of the housing 71, contact elements in the form of contact pads 73 and 74 are present, these being adapted to provide low resistance when the input device 70 is put on the reference surface. The pads 73 and 74 can comprise any suitable low resistance material, such as PTFE. An example of PTFE that can be used is the material commercialized under the trademark Teflon®. A typical grade adapted for use in the input device 70 according to FIG. 4 would be grade T-100.

The input device 70 is provided with a touch surface 75. The touch surface 75 could include, in a first instance, an active surface including a second input sensor in order to allow the input device 70 to operate in a second operating mode or touch pad mode. The touch surface 75 could also provide areas which allow the touch surface to be used as mouse buttons (not shown).

In the interior of the body 71, a motor 80 is present. The motor 80 is adapted to operate an assembly of arms which is schematically indicated with reference number 81. The assembly of arms is connected to a bottom plate 90.

With regards to the functioning of the input device 70 according to FIG. 4, the input device 70 is adapted to contact a reference surface on which the input device 70 is positioned, by means of either the pads 73 and 74 in order to allow the input device 70 to be moved in relation to said reference surfaces with relatively low friction between the bottom of the input device 70 and said reference surfaces. To allow this, the motor 80 must be used to ensure that the bottom plate 90 is positioned such that it is out of contact with said reference surface.

In a second operating mode, the motor 80 and the connected assembly of arms is used to move the bottom plate 90 to a position wherein the bottom plate projects outside the body 71. Thus, the pads 73 and 74 are no longer in contact with the reference surface on which the input device 70 is moved. In this operating mode, the bottom plate 90 is in contact with the reference surface. The bottom plate 90 includes high-friction material which could be, for instance, UPE. A typical grade which is suitable for use in an input device 70 according to FIG. 4 would be CHR-2302.

In use, the input device 70 according to FIG. 4 can operate on either a first operating mode or mouse mode with the bottom plate inside the housing 71 allowing the input device to contact a reference surface with the low-friction pads 73 and 74. As soon as the control sensor 72 at the side of the housing 71 detects that the intention of the user is to use the device as a touch pad, the motor can be used to allow the bottom plate 90 to be moved from an inside position to an outside position in order to allow direct contact between the bottom plate and the reference surface on which the input device 70 is used. Due to the presence of high-friction material on the bottom plate, the friction between the input device 70 and the reference surface is increased, allowing the use of an active surface, present on the touch surface 75, without moving of the input device in relation to the reference surface.

The motor 80 could have the form of an electrical servo-motor, adapted to produce linear displacements. Alternatively, a motor producing angular movements could be used.

The assembly of shafts to displace the bottom plate could include eccentric shafts and connecting rods to transfer the movement from the motor 80 to the bottom plate.

The motor 80 is able to maintain the position of the movable bottom plate when not powered. This means that no energy is required to maintain the bottom plate in a given position. This feature allows the power consumption of the device to be low, despite the presence of moving elements.

The input device 70 according to FIG. 4 could be used as described herein. The input device 70 would be in its second or touch pad mode as a default. This means that the bottom plate is in the low position, allowing the bottom plate to touch the reference surface on which the device is used. This means that the friction between the device and the reference surface would be high. The optical sensor used as the input sensor for the mouse mode under the device 70 would still be able to monitor possible displacements relative to the reference surface, however these displacements would not be reported by the device and would not lead to the generation of instructions.

In the touch pad mode, the gesture set selected could include a 1-finger slide to move the cursor on the screen, a 2-finger slide to scroll, and other gestures commonly available on multi-finger touch pads.

Once the device 70 is operating in its first or mouse mode, the following would apply. The bottom plate is in the up position meaning that it is lifted inside the housing of the device 70. This allows for the friction between the device and the reference surface on which the device is used to be low. The optical sensor used as the input sensor for the mouse mode under the device 70 is enabled, which means that displacements on the table reference surface would lead to the generation of instructions, such as the moving of the cursor on the screen.

In the mouse mode, the gesture set could comprise a 1-finger slide to scroll and tap to click.

The following criteria could be used to switch from the default touch pad mode to mouse mode. For example, detecting at least one finger on at least one side sensor could be used to switch from the default touch pad mode to mouse mode. Or, detecting a displacement relative to the reference surface by the optical sensor, used as input sensor on the bottom of the device, could be used to switch from the default touch pad mode to mouse mode.

The following criteria could be used to switch from the mouse mode to the touch pad mode. For example, when no finger is detected on the side sensors or when the device is not moving, the device can be switched from the mouse mode to the touch pad mode.

The switching between the first and second operating mode of the device may be improved in one the following manners described herein. For example, where the device is in the mouse mode, it would be possible to add a delay before leaving mouse mode. The reason would be that a user operating the device in mouse mode may briefly stop moving or touching the device for a short time period. If this leads to switching backwards and forwards between modes, this might have a negative effect on the user experience In one example, if no contact with at least part of the hand of the user is detected by means of the control sensor at the side of the device, the switching to mouse mode could be executed only after a minimum displacement of, for example, 5 mm. This would be useful to avoid spurious mode changes triggered by minute displacements of the device on the reference surface In one example, it would be possible that the palm of the hand of a user is detected on the active surface on the top of the device to switch to mouse mode even if no other part of the hand, like the fingers, is detected by the control sensors on the side In one example, if the active surface on the top of the device is activated before the control sensors on the side of the device, the device remains in touch pad mode. The user is most likely touching the side of the active surface which functions as the touch pad with his thumb or little finger while operating the device with his index or middle finger In one example, if two fingers are detected near the back of the control sensors on the side of the device, the device remains in touch pad mode. The user is most likely maintaining the device between his thumb and little finger while activating the top touch zone with his index or middle finger In one example, if proximity sensors are used instead of touch sensors, the device would be able to switch to mouse mode slightly before the user takes hold of it, providing a better user experience.

Figure 5:
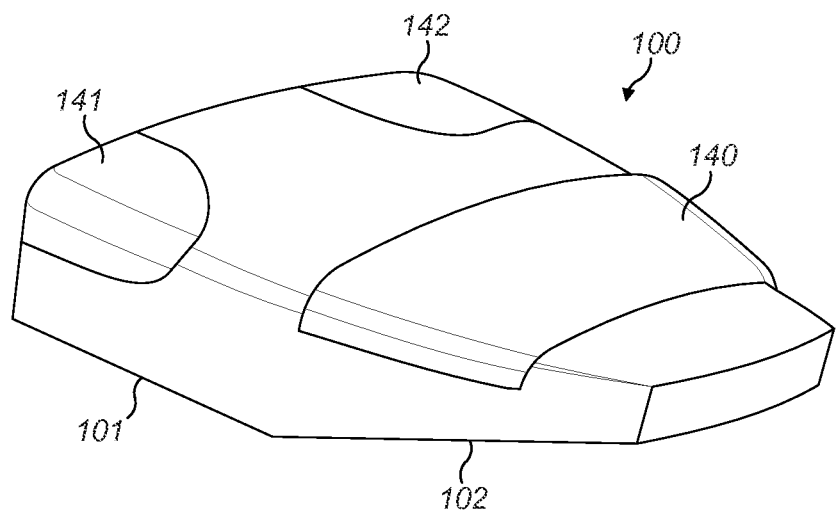
FIG. 5 shows another example embodiment of an input device.
Figure 6:
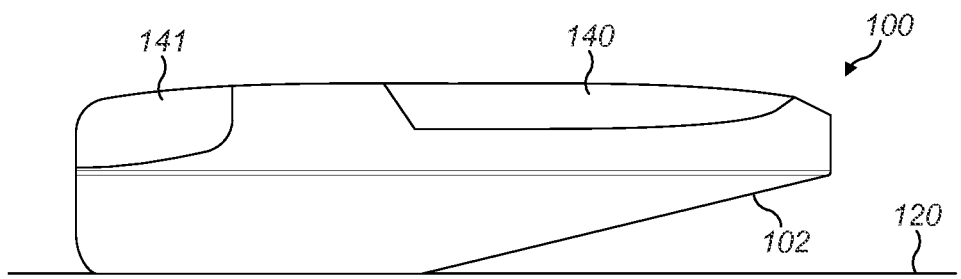
FIG. 6 shows the example input device according to FIG. 5 with a first contact surface in contact with the reference surface.
Figure 7:
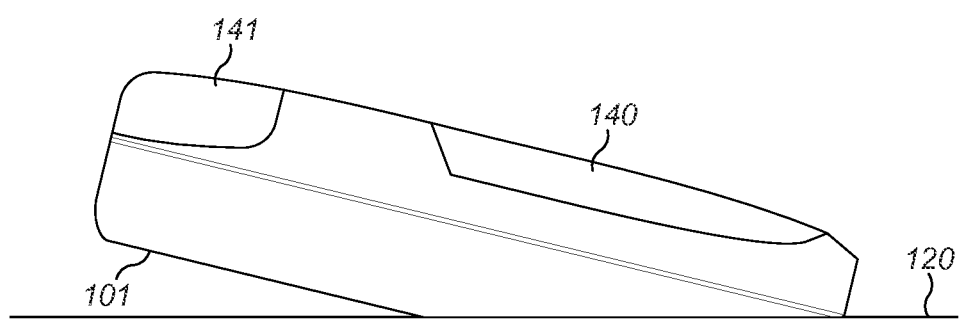
FIG. 7 shows the example input device according to FIG. 5 with a second contact surface in contact with the reference surface.

In FIGS. 5, 6 and 7, a third embodiment of an input device 100 is shown. The input device 100 includes a first input means positioned at the bottom of the device 100 (not shown) which functions in cooperation with mouse buttons 141 and 142. The input device 100 includes a second means for receiving instructions in the form of an active surface or touch pad surface 140.

The input device 100 includes a first contact surface 101 for contacting a reference surface 120 and a second contact surface 102 for contacting a reference surface 120. The first contact surface 101 includes relatively low friction material and is positioned to be underneath the mouse buttons 141, 142. The second contact surface 102 includes relatively high friction material and is positioned to be underneath the active surface 140.

If the user takes the input device 100 in his hand with the intention of using the input device 100 as a mouse, the user will exert pressure on the top end, including the buttons 141 and 142 and the input device 100 will pivot forwards. Therefore, the input device 100 will contact the reference surface 120 with the first contact surface 101. This is shown in FIG. 6. Since the first contact surface includes relatively low friction material, the input device 100 can be moved over the reference surface with relatively low friction existing between the input device 100 and the reference surface 120.

If the user has the intention of using the input device 100 as a touch pad, the user will only exert pressure on the active surface 140 and the input device 100 will pivot backwards. The input device 100 will contact the reference surface 120 with the second contact surface 102. This is shown in FIG. 7. Since the second contact surface includes relatively high friction material, the input device 100 will not move with respect to the reference surface 120 when the user moves his fingers or a pointer over the active surface 140.

The input device 100 may include detecting means such as an orientation sensor, for example a gyroscope, for the input device to detect its position with respect to the reference surface to thereby detect the selected operating mode.

Figure 8:
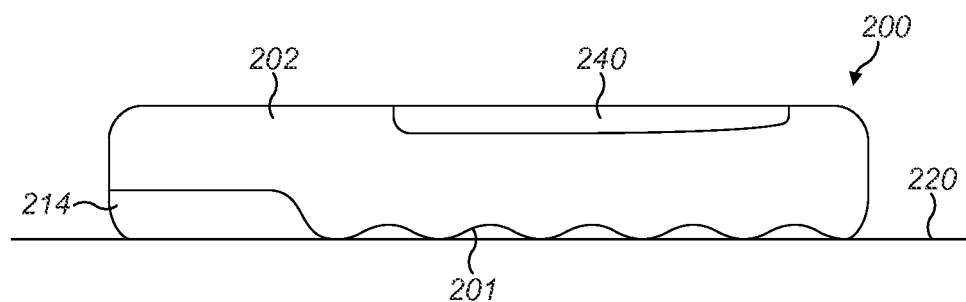
FIG. 8 shows another example embodiment of an input device in contact with the reference surface with a first contact surface.
Figure 9:
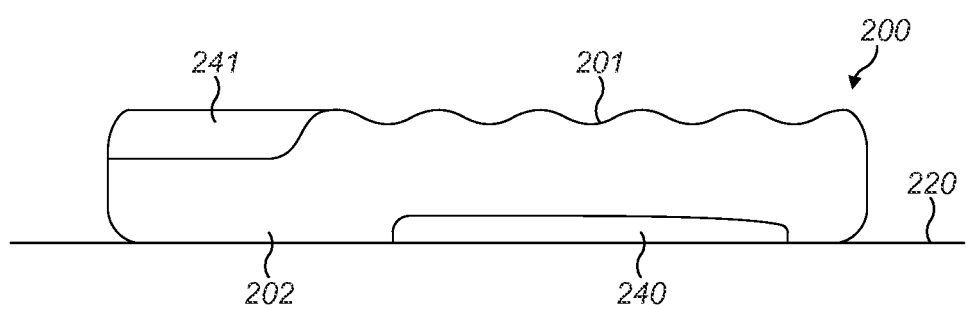
FIG. 9 shows the example input device according to FIG. 8, in contact with the reference surface with a second contact surface.

A further embodiment of an input device 200 of the invention is shown in FIGS. 8 and 9.

In FIG. 8, the input device 200 is shown in a first position. The input device 200 includes a body or frame with, on one side, an active surface or touch pad 240. In the position shown in FIG. 8, the active surface 240 is positioned on the top of the input device 200 allowing the user to touch the touch pad 240. In the position according to FIG. 8, the input device 200 contacts the contact surface 220 by means of a contact surface 201 with relatively high friction. This relatively high friction is schematically indicated by means of a waved line. With the input device 200, contacting the reference surface 220 with the contact surface 201 providing relatively high friction, the input device 200 is ready to be used in touch pad mode. When a user contacts the active surface 240, with either a finger or a pointer, the input device is not moved with respect to the reference surface 220. To allow the input device 200 to work in a second operating mode, the input device 200 can be turned upside down. This is shown in FIG. 9. The input device 200 contacts the reference surface 220 with the surface 202 including the active surface 240. This second surface 202 of the input device 200 provides relatively low friction. In the position as indicated in FIG. 9, mouse buttons 241 and 242 (only the mouse button 241 is visible in FIG. 9) are accessible for the user to generate instructions. With the input device 200 in contact with the reference surface 220 by means of the contact surface 202 providing relatively low friction, the input device 200 can be moved with respect to the reference surface 220 to operate in mouse mode.

The input device 200 may also include an orientation sensor, such as a gyroscope, for the input device to detect its position with respect to the reference surface to thereby detect the selected operating mode.

Figure 10:
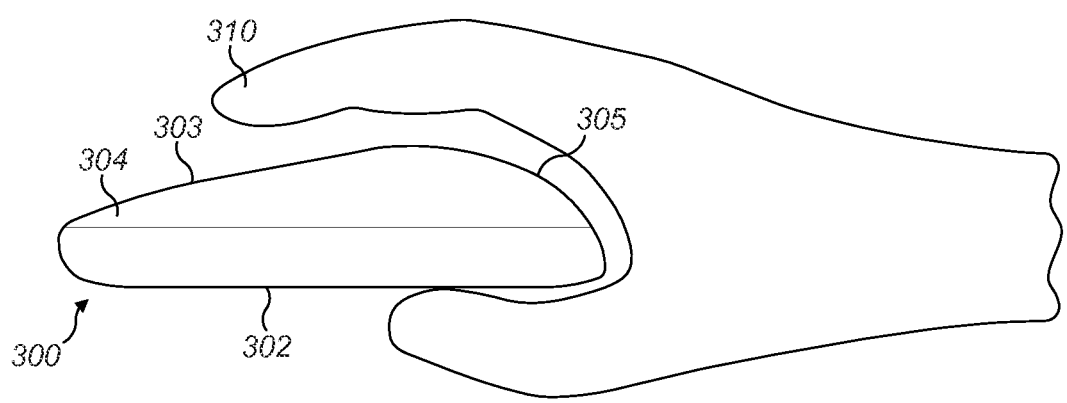
FIG. 10 shows another example embodiment of an input device.

In FIG. 10, a fifth embodiment of the input device is shown. The input device 300 includes a contact surface 302 which is adapted to contact a reference surface. The top surface 303 of the input device 300 according to FIG. 10 includes two distinct elements having a first part (seen from left to right in FIG. 10) 304 which is angled in relation to contact element 302 of the input device. As shown in FIG. 10, the first part 304 of the top surface 303 is adapted to be used as an active surface, wherein the fingers 310 of a user can be used to generate instructions by moving the fingers over said active surface. The fact that the first element 304 of the top surface 303 is inclined allows for finger movement away from the user to generate less friction. The top surface 303 typically includes relatively hard, low-friction material such as PTFE or glass, wherein the glass could be provided with some texture. The second part 305 of the top surface 303 of the input device 300 is rounded in order to allow for the palm of the hand of a user to rest on the second part 305, preventing the input device 300 from gliding during finger movement towards the user. The input device 300 provides a balance between the friction between the contact surface 302 and a reference surface on which the input device 300 is used to allow the use of the input device 300 in both a first operating mode or mouse mode and a second operating mode or touch pad mode. In order to achieve this, the weight of the input device 300 is selected to be less than 250 g. At the same time, in order to prevent the input device 300 from moving whenever the fingers 310 exert a certain pressure on the top surface 303 of the input device 300, the weight is selected to be no less than 60 g. In one example, the weight of the input device is between 100 g and 200 g, ideally around 150 g.

In order to enable proper use of the input device 300 in its second operating mode or touch pad mode, the friction exerted by the fingers 310 on the top surface 303 should be lower than the friction between the contact element 302 and a reference surface on which the input device 300 is used.

In addition to the embodiments that have been described above, an input device could be provided with mechanical mouse buttons in the front area of the device, in one example.

The presence of such mechanical mouse buttons would allow a device with one zone with mechanical buttons at the front of the device for mouse operations with, for instance, a proximity sensor under each button. In addition to this the device would comprise one large touch zone at the back of the device for touch pad operations with a capacitive sensor.

The conditions to switch to mouse mode could include detecting fingers above the mouse buttons by proximity sensors, detecting a palm on the active surface used for the touch pad mode, and detecting a displacement relative to the reference surface by the input sensor for the mouse mode, in the form of an optical sensor, for example.

None of the above mentioned conditions being met could indicate a condition to switch to touch pad mode, for example.

In yet another embodiment, the input device could include a superior flat surface with one input sensor. This would mean that a first upper area would be dedicated to the mouse mode and the other area would correspond to the use in touch pad mode. In this embodiment, the location of the fingers would determine which mode would be used for the device. It would be possible to operate the device to reinitialize the device once the fingers are no longer detected, and to allow the device to go to mouse mode.

In an example embodiment, the device could include dedicated touch zones for mouse and touchpad operation. For example, the device could include two virtual zones in a large touch sensor, separated by a small rim, including a front zone primarily dedicated for mouse operations and a back zone primarily dedicated for touch pad operations. The operating mode may be determined by the zone in which the part of the hand, such as the fingers, makes contact with the device. In one example, after landing of part of the hand of a user in a zone, the fingers of a user are allowed to cross the zone boundary without triggering a mode change of the device.

Conditions may be imposed to switch to mouse mode. For example, the device may switch to mouse mode when one or more fingers land in the front zone or when a displacement relative to the reference surface is detected by the input sensor for the mouse mode, in the form of an optical sensor.

None of the above mentioned conditions being met could indicate a condition to switch to touch pad mode, for example.

What is claimed is:

1. An input device for a computing electronic device comprising:
    a first input sensor configured to receive a first type of instruction associated with a first operating mode of the input device, wherein the first type of instruction comprises detecting movement of the first input sensor with respect to a reference surface, and wherein the first operating mode corresponds to a mouse mode;
    a second input sensor configured to receive a second type of instruction associated with a second operating mode of the input device, wherein the second type of instruction comprises detecting movement of an indicator with respect to an active surface of the input device, and wherein the second operating mode corresponds to a touch pad mode; and
    a control sensor disposed on the input device and configured to detect at least a portion of a hand of a user with respect to the input device;
    a controller configured to, in response to the control sensor detecting the at least a portion of the hand of the user, cause the input device to selectively operate in the first operating mode and, in response to the control sensor not detecting the at least a portion of the hand of the user, cause the input device to selectively operate in the second operating mode;
    a contact element comprising a contact surface substantially forming a bottom cover of the input device, the contact element adapted to be selectively moved to an inside position within the input device and to an outside position out of the input device by a motor inside of the input device, wherein the contact element is configured to selectively:
        contact the reference surface with the contact surface in the outside position to provide a first level of friction between the input device and the reference surface; and
        not contact the reference surface with the contact surface in the inside position such that a second level of friction is provided between the input device and the reference surface, the second level of friction being less than the first level of friction; and
    wherein the contact surface is selectively moved to contact the reference surface in response to the input device being operated in the second operating mode and is selectively moved to not contact the reference surface in response to the input device being operated in the first operating mode.

2. The input device according to claim 1, further comprising an outside surface and wherein the control sensor comprises a pressure sensor configured to detect contact between the outside surface and the at least a portion of the hand of the user.

3. The input device according to claim 1, wherein the control sensor comprises an optical sensor configured to detect a proximity of the at least a portion of the hand of the user relative to the input device.

4. The input device according to claim 1, wherein the control sensor comprises a touch sensor configured to detect contact between the at least a portion of the hand of the user and the input device.

5. The input device according to claim 1, wherein the control sensor comprises a proximity sensor configured to sense the at least a portion of the hand of the user at a given distance relative to the input device.

6. The input device according to claim 1,
    wherein the contact element is a first contact element comprising a first contact surface, the first contact element being configured to contact the reference surface with the first contact surface to provide the first level of friction;
    the input device further comprising:
    a second contact element comprising a second contact surface configured to contact the reference surface with the second contact surface to provide the second level of friction.

7. The input device according to claim 6,
    further comprising a mechanism;
    wherein, in the first operating mode, the mechanism is in a first state such that the first contact surface of the first contact element is not in contact with the reference surface; and
    wherein, in the second operating mode, the mechanism is in a second state, different from the first state, such that the first contact surface of the first contact element is in contact with the reference surface.

8. The input device according to claim 6, wherein the second contact element comprises a low friction material having at least one of polytetrafluoroethylene or silicone rubber.

9. A method for operating a computing device by means of an input device, the method comprising:
    receiving, at a first input sensor, a first type of instruction associated with a first operating mode of the input device wherein the first type of instruction comprises detecting movement of the first input sensor with respect to a reference surface, and wherein the first operating mode corresponds to a mouse mode;
    receiving, at a second input sensor, a second type of instruction associated with a second operating mode of the input device, wherein the second type of instruction comprises detecting movement of an indicator with respect to an active surface of the input device, and wherein the second operating mode corresponds to a touch pad mode;
    detecting, at a control sensor disposed on the input device, at least a portion of a hand of a user with respect to the input device;
    selectively changing, at a controller, in response to the control sensor detecting the at least a portion of the hand of the user, an operating mode of the input device to the first operating mode and, in response to the control sensor not detecting the at least a portion of the hand of the user, an operating mode of the input device to the second operating mode; and
    selectively configuring a contact element comprising a contact surface substantially forming a bottom cover of the input device to be selectively moved to an inside position within the input device and to an outside position out of the input device by a motor inside of the input device, the contact element selectively configured to:

contact the reference surface with the contact surface in the outside position to provide a first level of friction between the input device and the reference surface; and not contact the reference surface with the contact surface in the inside position such that a second level of friction is provided between the input device and the reference surface, the second level of friction being less than the first level of friction; and wherein the contact surface is selectively moved to contact the reference surface in response to the input device being operated in the second operating mode and is selectively moved to not contact the reference surface in response to the input device being operated in the first operating mode.

10. The method according to claim 9, further comprising:

detecting, at the control sensor, a first position of the at least a portion of the hand of the user;

detecting, at the control sensor, a second position of the at least a portion of the hand of the user;

determining, at the controller, that the second position is different form the first position; and wherein the selectively changing the operating mode of the input device is in response to the determining that the second position is different form the first position.

11. The method according to claim 9, wherein the contact element corresponds to a first contact element and the contact surface corresponds to a first contact surface;

further comprising:

configuring the first contact element to contact the reference surface with the first contact surface to provide the first level of friction; or configuring a second contact element comprising a second contact surface to contact the reference surface with the second contact surface to provide the second level of friction.

12. The input device of claim 1, wherein, while operating in the mouse mode, the input device is configured to detect movement of the input device with respect to the reference surface and detect actuation of a member by a user of the input device, the actuation of the member corresponding to a mouse click.

13. The input device of claim 12, wherein the member is a button separate and distinct from the active surface.

14. The input device of claim 1, wherein, while operating in the second operating mode, the detecting movement of the first input sensor with respect to the reference surface is disregarded.

15. The input device of claim 1, wherein, while operating in the first operating mode, the second input sensor is configured to detect movement of the indicator with respect to the active surface of the input device.

16. The input device of claim 1, wherein the controller is configured to change operating modes of the input device between the first operating mode or the second operating mode after a delay period following the detecting the at least the portion of the hand of the user.

* * * * *